UNITED STATES PATENT OFFICE.

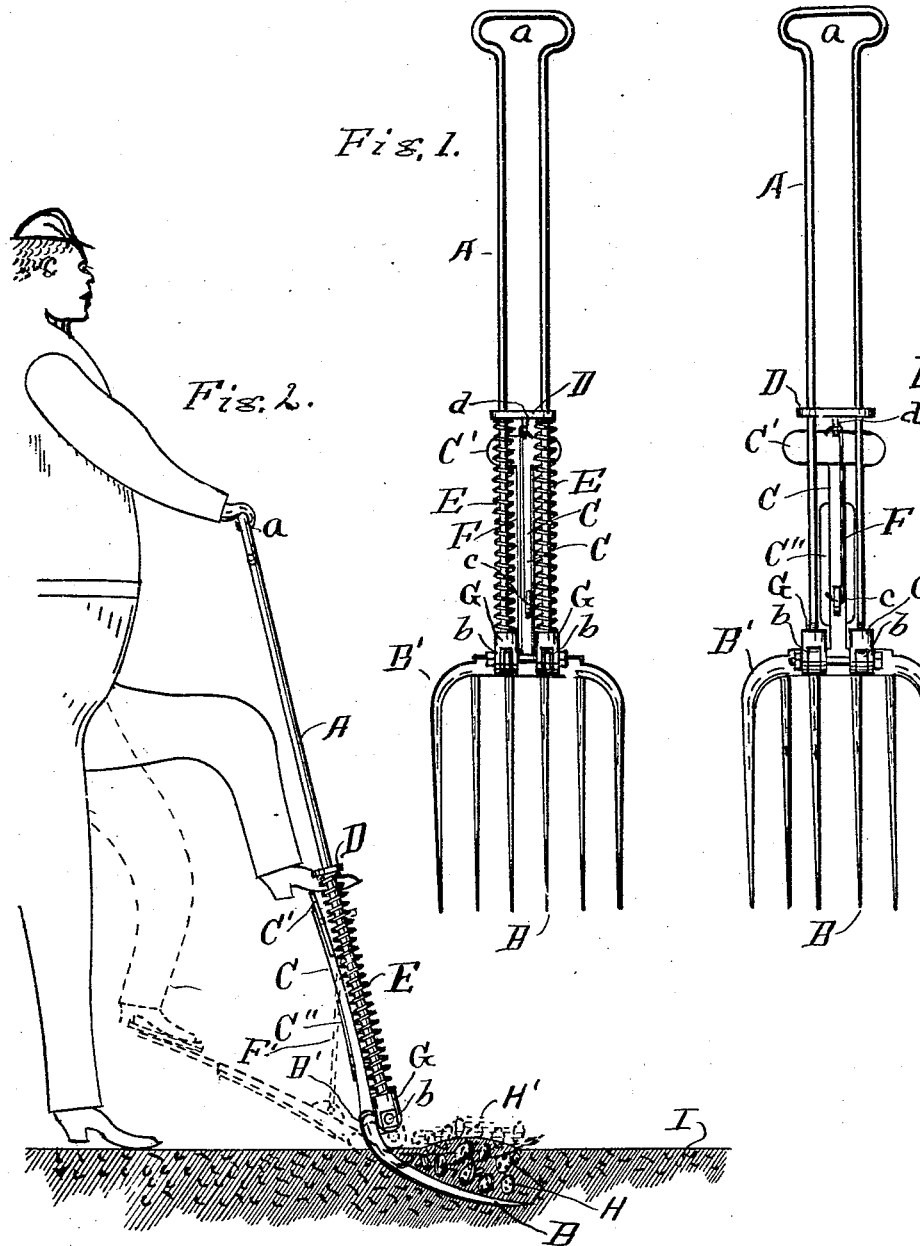

HORACE P. STEWART, OF GRAND RAPIDS, MICHIGAN.

POTATO-DIGGER.

943,325. Specification of Letters Patent. Patented Dec. 14, 1909.

Application filed September 20, 1909. Serial No. 518,710.

*To all whom it may concern:*

Be it known that I, HORACE P. STEWART, a citizen of the United States, residing at Grand Rapids, in the county of Kent and State of Michigan, have invented certain new and useful Improvements in Potato-Diggers, of which the following is a specification.

My invention relates to improvements in appliances for digging potatoes and other vegetables, and its object is to provide an implement with which the potatoes or other vegetables may be thrown above the surface of the soil without the necessity of the operator stooping down and lifting the entire load by main strength.

I attain this object by the mechanism illustrated in the accompanying drawing, in which—

Figure 1 is a front elevation of the implement complete. Fig. 2 is a side elevation of the same showing it in use; and, Fig. 3 is a front elevation of the same with the actuating springs removed.

Similar letters refer to similar parts throughout the several views.

This implement consists of a series of tines B, similar to the tines of an ordinary potato fork, having a long shank C projecting upward therefrom, and provided with a bifurcated handle A that is pivotally attached to the fork member, as at $b$, so that the fork member may be made to swing thereon at the pleasure of the operator.

The fork member is held to normal position with the handle by means of spiral, or other suitable form of springs. I prefer the use of spiral springs coiled around the two prongs of the handle A, as shown at E, and made to bear, at one end, against the stationary heads G, and at the other end against the slide D. A link, F, is secured, at one end, to the ear $d$ on the slide D, and at the other end to the ear $c$ on the fork shank C so that the strength of the springs E E is made to act directly upon the shank to draw and hold it to position parallel with the handle A.

When the fork, B, has been forced into the ground I, by pressing upon the shoulders B' with the foot, or otherwise, until its tines are well under the potatoes H, the shank C, of the fork, is thrown downward, as indicated by the dotted lines in Fig. 2, by the operator placing his foot upon the cross head C', at the upper end of the shank C, and pressing downward thereon, as indicated in Fig. 2, when the tines of the fork will be raised upward and the potatoes will be raised above the ground, as indicated by the dotted lines H', and there separated from the soil ready to dry and be picked up off of the ground.

The dotted lines $F^1$, in Fig. 2, represent the position of the link F when the shank C of the fork is forced downward to raise the potatoes out of the ground, and is here shown for the purpose of illustrating its action upon the shank to force the fork back to normal position by the action of the springs E E after the potatoes have been raised above ground.

C" represents a flat guard that is made integral with, or is securely attached to the shank C to prevent it from sinking into the ground if the shank is forced solidly upon the ground.

The fork is held to position by the operator, when forcing the tines into the ground, &c., by clasping the hand bar $a$ with the hand, as indicated.

The springs E E must be of sufficient strength to hold the fork and handle in proper normal position when the tines B of the fork are being forced into the ground, so that there will be no danger of the shank dropping, or being forced down toward the ground when forcing the tines into the ground, until it is carried or forced down by the operator.

I prefer that the heads G be screwed upon the handles, as by this means the fork may be assembled or taken apart by simply inserting or withdrawing the bolt $b$, and placing the heads on or off, as the case may be, when all other parts of the digger, the springs, the slide, &c. may be put on or taken off at the pleasure of the operator.

What I claim as new, and desire to secure by Letters Patent of the United States, is:

1. A potato digger consisting of a tined fork having a long shank projecting upward therefrom, bifurcated handles pivotally attached to the fork, heads formed on the handle near the pivotal bearings, a slide placed upon the handle and having an ear thereon, an ear on the shank, a link secured in the ears on the slide and the shank, and springs on the handle with one end pressing against the heads on the handle and the other end pressing against the slide on the handle.

2. A potato digger consisting of a tined fork having a long shank integral therewith, cross head at the end of the shank, a handle pivotally attached to the fork, a slide placed upon the handle and having an ear thereon, a corresponding ear on the shank near the fork, a link pivotally secured in the ear on the slide and the ear on the shank, heads on the handle near the pivotal bearing with the fork, springs encircling the handle and bearing at one end against the heads and at the other end against the slide.

3. A potato digger consisting of a fork having tines, a long shank integral with the fork, a cross head, a guard and an ear on the shank, a handle pivotally attached to the fork and having heads near the pivotal bearing, a slide on the handle, a link secured to the ear on the slide and to the ear on the shank, and springs encircling the handle and bearing against the heads at one end and against the slide at the other end, substantially as, and for the purpose set forth.

Signed at Grand Rapids, Michigan, September 4th 1909.

HORACE P. STEWART.

In presence of—
   ITHIEL J. CILLEY.
   FRED R. JEAN.